United States Patent
Levine (12) 
(10) Patent No.: US 6,248,377 B1
(45) Date of Patent: Jun. 19, 2001

(54) FOOD SELECTION SYSTEM AND METHOD FOR ANIMALS

(76) Inventor: Michael L. Levine, 2331 SW. Luradel St., Portland, OR (US) 97219-6314

( * ) Notice: Subject to any disclaimer, the term of this patent is extended or adjusted under 35 U.S.C. 154(b) by 0 days.

(21) Appl. No.: 09/613,166

(22) Filed: Jul. 10, 2000

Related U.S. Application Data (63) Continuation of application No. PCT/US99/25531, filed on Oct. 29, 1999, which is a continuation-in-part of application No. 09/245,057, filed on Feb. 4, 1999, now abandoned.
(60) Provisional application No. 60/123,449, filed on Mar. 9, 1999, and provisional application No. 06/106,888, filed on Nov. 3, 1998.

(51) Int. Cl.[7] .............................. B65D 85/00; A01K 29/00
(52) U.S. Cl. ................................. 426/87; 426/2; 426/805; 426/132; 426/383; 119/711; 206/459.5
(58) Field of Search .................................. 426/87, 2, 112, 426/805, 383, 132; 119/52.4, 711; 206/459.5; 428/905; 239/55, 54, 60

(56) References Cited

U.S. PATENT DOCUMENTS

| | | |
|---|---|---|
| 3,871,334 | 3/1975 | Axelrod ............................... 426/805 |
| 3,946,123 | 3/1976 | Hanna .................................. 426/643 |
| 4,045,585 | 8/1977 | Appleman et al. .................. 426/331 |

(List continued on next page.)

FOREIGN PATENT DOCUMENTS

| | | |
|---|---|---|
| 592000A | 6/1975 | (CH) ............................ A45D/34/00 |

OTHER PUBLICATIONS

"Catfood Scratch 'n' Sniff," *Catfood Magazine*, http://www.catfood.demon.co.uk/computing/sniff.html, c. 1997–1998, United Kingdom.

Belkin, Lisa; "Shopping is Getting Much More Complicated," *New York Times*, Aug. 8, 1985, Thursday, Late City Final Edition.

*Packaging Week*, V.0, No. 0, p. 18, "Pushing Frontiers Forward Creates a New Dimension," Jun. 2, 1994.

Mennella, J.A. and Beauchamp, G.K.; "Infant's Exploration of Scented Toys: Effects of Prior Experiences," *Chemical Senses*, 23(1):11–7, Feb. 1998.

Johnson, Pam, "Treats and Behavior" *Cat Fancy*, Dec. 1996; http://www.animalnetwork.com/cats/library/behavior/general/treats.asp.

Vaughan, Don, "Tricks for Treats" *Cat Fancy*, Dec. 1997; http://www.animalnetwork.com/cats/library/behavior/general/tranining9712.asp.

"Something Smells Funny," *Cow and Chicken, Smelly Telly*, Cartoon Network, Apr. 1999.

*Primary Examiner*—Milton Cano
*Assistant Examiner*—Robert Madsen
(74) *Attorney, Agent, or Firm*—Stoel Rives LLP (57) ABSTRACT

A scent area (14) is integrated into or attached to a food label (12). The scent area (14) preferably contains the scent and/or taste of the contents within the food container (10). The scent area (14) preferably includes scratch and sniff technology and/or is covered with a peel-off type cover to preserve the freshness of the scent area (14) during shipping and storage. Pets, can then sniff or lick the scent areas (14) from an assortment of food containers (10) and show a preference for a meal selection. In a further embodiment, a row, column, or array of spaced-apart scent areas can be presented to a pet, and through sniff and/or taste the pet can indicate the types or flavors of food preferred. Similarly, food-scented cards, game pieces, or toys can be presented to a pet who can select a card, game piece, or toy to indicate the type and/or flavor of food preferred for the next meal. The pet owner could also use the preference indications to purchase preferred food types and/or flavors.

47 Claims, 3 Drawing Sheets

U.S. PATENT DOCUMENTS

| | | | |
|---|---|---|---|
| 4,674,444 | 6/1987 | Axelrod | 119/29.5 |
| 4,762,493 | 8/1988 | Anderson | 434/84 |
| 4,898,633 | 2/1990 | Doree et al. | 156/145 |
| 4,983,404 | 1/1991 | Raman et al. | 426/3 |
| 5,018,974 | 5/1991 | Carnahan et al. | 434/98 |
| 5,039,243 | 8/1991 | O'Brien | 401/49 |
| 5,114,735 | 5/1992 | Rua, Jr. et al. | 427/7 |
| 5,175,142 | 12/1992 | Dervieux et al. | 512/4 |
| 5,186,124 | 2/1993 | Woodford | 119/29 |
| 5,249,676 | 10/1993 | Ashcraft et al. | 206/264 |
| 5,282,572 | 2/1994 | Fuller | 239/56 |
| 5,375,701 | 12/1994 | Hustad et al. | 206/45.18 |
| 5,419,958 | 5/1995 | Charbonneau | 428/315 |
| 5,609,710 | 3/1997 | Charbonneau | 156/276 |
| 5,635,229 | 6/1997 | Ray | 426/112 |
| 5,640,931 | 6/1997 | Markham | 119/711 |
| 5,695,798 | 12/1997 | Rozzano | 426/115 |
| 5,813,366 | 9/1998 | Mauldin, Jr. | 119/710 |
| 5,858,494 | 1/1999 | Cherkas et al. | 428/40.1 |
| 5,925,390 | 7/1999 | Kornacki | 426/87 |
| 6,102,224 | 8/2000 | Sun et al. | 215/252 |
| 6,112,749 | 9/2000 | Hall et al. | 128/898 |

FOOD SELECTION SYSTEM AND METHOD FOR ANIMALS

This application is a continuation of PCT/US/99/25531, filed Oct. 29, 1999, which claims priority of U.S. Provisional Application No. 60/123,449, filed Mar. 9, 1999 and is a continuation-in-part of U.S. patent application Ser. No. 09/245,057, filed Feb. 4, 1999, now abandoned, which claims benefit of U.S. Provisional Application No. 60/106888, filed Nov. 3, 1998.

TECHNICAL FIELD

The present invention relates to selection of food in sealed, olfactory-isolating containers and, in particular, to a system and method that facilitate food type and/or flavor selection by animals, such as pets, human infants, and human adults, based on olfactory cues that are external to the containers and that may be optionally associated with visual cues or objects.

BACKGROUND OF THE INVENTION

Food types are presented herein only by way of example to pet or infant foods, although adult human food types such as wines or pasta sauces are also considered. Some types of animal or pet food are available in a variety of textures, flavors, or ingredients. Canned cat food, for example, may include poultry, fish, or beef and may be juicy, ground, sliced, shredded, or chunky. This variety makes it easier for the owners of the animals to find particular foods that the animals will eat. Unfortunately, some animals, such as cats or human infants, are notoriously finicky and may choose not to eat certain foods at all. Some animals will, however, joyfully devour one type of food on any given day but refuse to eat the same type of food the next day or the next week. This finicky behavior poses a serious expense problem for the owners of spoiled pets, as well as for the owners of old or sickly pets, which must be encouraged to eat sufficient amounts to keep them healthy. Unfortunately, the labels on conventional animal food and baby food containers are adapted to attract the attention of the animal owner or parent and not the animal or baby, respectively. Similarly, the labels of sauces, wines, and other adult food types sold in sealed containers, such as cans, bottles, or jars, rely largely on visual information to attract a potential purchaser. Accordingly, a method or a system that permits animals or infants to make their own food choices would be desirable. Furthermore, a method or a system that presents consumers with additional information, preferably on the product labels, about a sealed food product prior to purchase would be advantageous to consumers.

SUMMARY OF THE INVENTION

An object of the present invention is to provide olfactory information corresponding to a sealed food product to aid a potential purchaser or food consumer in making a product or meal selection, respectively.

Another object of the present invention is to provide a method and/or system to facilitate meal selection by animals or infants.

A preferred embodiment of the present invention employs a scent area integrated into or attached to a food label. The scent area preferably contains the scent and/or taste of the contents within the food container. The scent area may also be covered with a peel-off type cover to preserve the freshness of the scent area during shipping and storage. Animals can sniff or lick the scent areas of an assortment of food containers and show a preference for a meal selection. Alternatively, animals or infants can be presented with food-scented cards, game pieces, or toys to make a meal selection based on the olfactory information and/or associated visual cues.

In a further embodiment, a row, column, or array of spaced-apart scent areas, a set of scented cards or icons, or a set of scented toys can be presented to a pet or infant prior to purchasing the food product, and through sniff and/or taste a pet or infant can indicate which types or flavors of food the animal or infant prefers. The pet owner or parent could then use the preference indications to purchase preferred food types and/or flavors.

Additional objects and advantages of this invention will be apparent from the following detailed description of preferred embodiments thereof, which proceeds with reference to the accompanying drawings.

DETAILED DESCRIPTION OF PREFERRED EMBODIMENTS

Figures 1, 4:
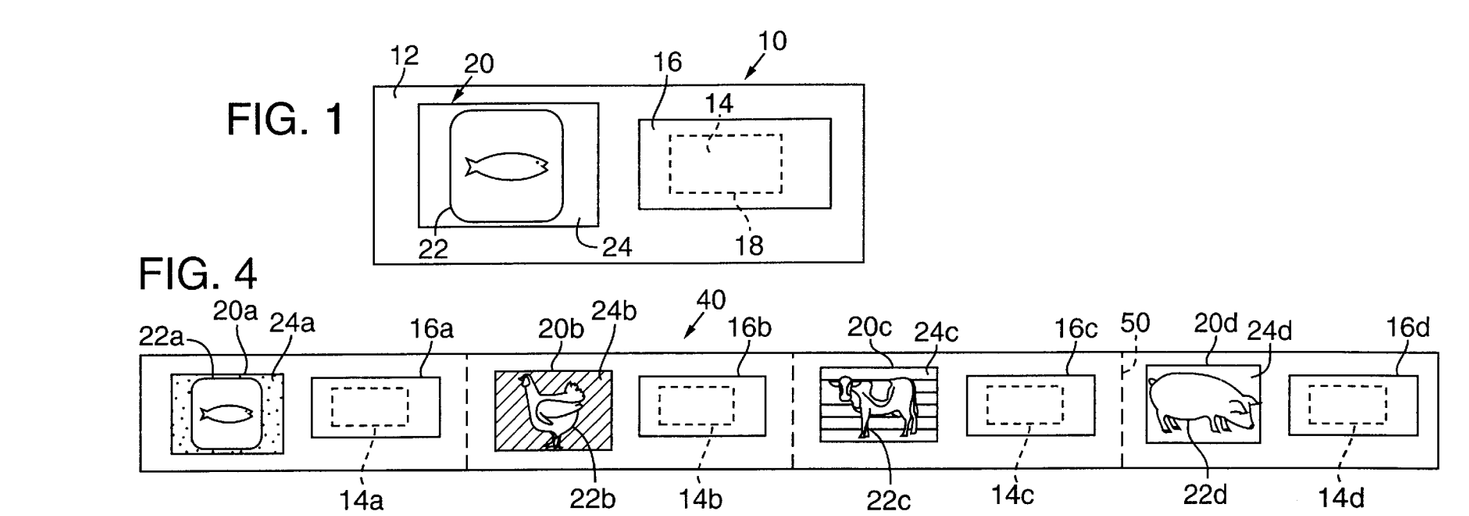
FIG. 1 is a side elevation view of a pet food can having a distinctive scent area indicative of the contents within the can.
FIG. 4 is a plan view of an embodiment of a sampler strip containing scent areas for a variety of pet food flavors.
Figure 2A:
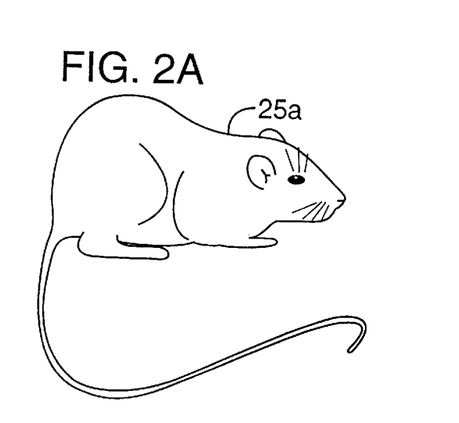
FIGS. 2A, 2B, 2C, and 2D are side elevation views of examples of a set of three-dimensional scented toys suitable for presenting to a pet to facilitate meal selection.
Figure 2B:
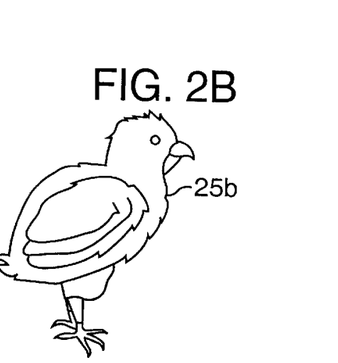
Figure 2C:
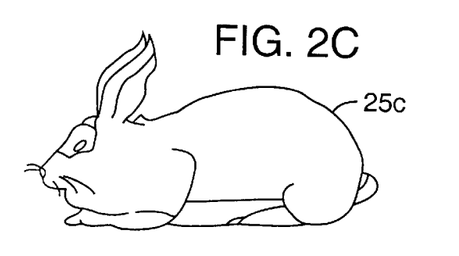
Figure 2D:
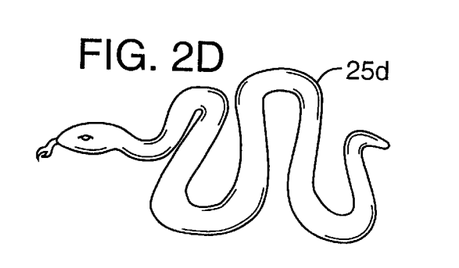
Figure 3A:
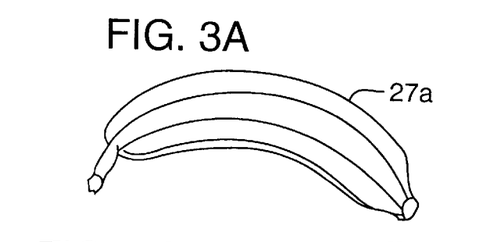
FIGS. 3A, 3B, 3C, and 3D are side elevation views of examples of a set of three-dimensional scented toys suitable for presenting to an infant to facilitate meal selection.
Figure 3B:
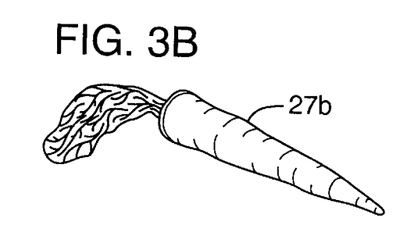
Figure 3C:
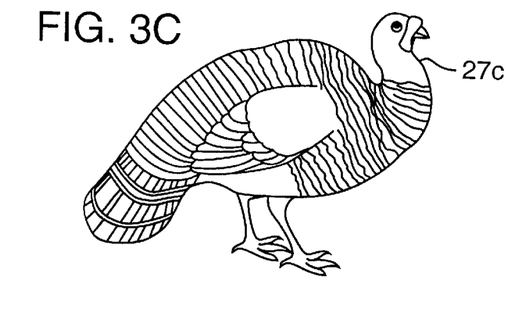
Figure 3D:
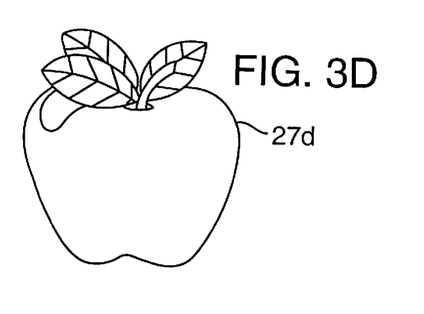

FIG. 1 shows a side elevation view of a pet food container 10, such a can, bottle, or jar, supporting a label 12 of the present invention. Containers 10 are typically manufactured from materials such as metal, plastic, or glass and are sealed such that the odors of the food products within containers 10 do not readily permeate through containers 10. Therefore, the odors of the food products are olfactorily isolated within containers 10, or olfactorily inhibited by containers 10, and typically cannot be detected by a pet, infant, or product purchaser. The food products comprise dry or wet food types. Such food types include, but are not limited to, pet foods such as cat food, baby foods, soups, sauces, herbs, wines, and cheeses.

With reference to FIG. 1, label 12 is preferably manufactured from porous paper substrates or other materials used for conventional labels or "scratch and sniff" substrates that are preferably adapted to be adhered to container 10 by a nontoxic and odorless adhesive. Label 12 supports a patch or scent area 14 that is integrated into label 12 or attached to an exterior surface of label 12. In one example for a can of cat food, label 12 has dimensions of about 1" high by 8" long, and scent area 14 has dimensions of up to 1" high to 2" to 4" long. Skilled persons will appreciate that the sizes of labels 12 and scent areas 14 can be adjusted to conform to the sizes of containers 10 and can be adapted to the sizes of the animals to which the scent areas 14 are to be directed. Skilled persons will also appreciate that scent areas 14 can be applied directly onto containers 10 or can be directly incorporated into certain types of plastic containers 10.

In one embodiment, scent area 14 comprises an absorbent nontoxic material, such as paper that has been dipped into or brushed with a scent producing element, such as ingredients similar to those packaged within container 10. The scent area 14 is then attached to label 12 with a nontoxic, odorless adhesive, such as Elmers® glue. Alternatively, the material used to form scent area 14 may be dipped into or brushed with one or more scent producing elements such as an oil extract of the main ingredient or a natural or synthetic compound, solution, or mixture that smells or tastes like one or more of the ingredients packaged within container 10. For example, edible, non-toxic liquid scents that could be used to scent or flavor the food product can be used to scent or flavor scent areas 14. Such scenting agents are known in the art and may be commercially available from Yorann Oils, Inc. of Lansing, Mich. Although scent area 14 is shown as rectangular, skilled persons will appreciate that scent area 14 may be formed in a variety of other shapes, such as circular, elliptical, or triangular. Skilled persons will also appreciate that smells or tastes applied to, or incorporated into, scent areas 14 are preferably nontoxic and have a long shelf life.

In a preferred embodiment, scent area 14 is covered by a protective coating that can be scratched off or a peel-off cover 16 that may, for example, be attached to label 12 with a nontoxic, odorless adhesive around three or four sides of perimeter 18 of scent area 14. Cover 16 is employed to keep fresh the scent or taste of scent area 14 during shipping and storage of food container 10. Cover 16 may also include a tab to make cover 16 easier to peel off label 12.

Additionally or alternatively, scent area 14 may incorporate a version or variation of "scratch and sniff" technology. For example, scent area 14 may be styled after the scent activatible sheets disclosed in U.S. Pat. No. 5,640,931 of Markham where scent area 14 may include one or more consecutively layered sheets of material, or scent area 14 may cover all or only a portion of label 12 where the application of the scent producing agent is integrated with the label printing process. The microencapsulated scent producing elements can be rolled or pressed onto labels 12 in a thin film. Microcapsules may be made from a wide variety of materials including, but not limited to, gelatin or synthetic polymeric materials. Microcapsules in a variety of sizes and compositions for scent and flavor release applications are available commercially from several sources, including Minnesota Mining and Manufacturing Company (3M) in St. Paul, Minn. The composition and thickness of the microcapsule coating may be adjusted to provide desirable fragrance release based on pressure, friction, or other factors.

Another method may be to simply coat label 12 with a liquid solution containing scent producing elements and then apply a sealing or protective coating over them. One method of applying scent producing elements to label 12 utilizes the method commercialized by Sandy Alexander, Inc. of Clifton, N.J. This scenting technology is marketed under the trademark "SCENTIFIC™" and employs a press varnish that may be directly applied to printing presses to enable the combination of high-quality color printing and scenting within an in-line operation. This process produces a label 12 with an integrated scent area 14 and permits labels 12 to be manufactured without an additional step. According to this process, the intensity of the scent can be controlled and the image printed on the sheet material does not have to be distorted or broken up to release the scent. Furthermore, this process allows application in defined spot areas and can allow multiple scents on a single sheet. Finally, according to this process, the scent release is activatible a number of times by a pet owner, parent, or potential purchaser and enables further control of the intensity and control of the duration of the scent. The SCENTIFIC™ process requires no special substrate or paper so conventional substrates for labels 12 are suitable, and the process costs much less that the 3M Scratch and Sniff process.

Skilled persons will recognize that, regardless of the scent delivery system, the scent intensity released corresponding to the food ingredient(s) within food container 10 should be well above the scent identification threshold for pets, infants, or consumers. Skilled persons will also appreciate that the scent intensity of the labels should be relatively little noticeable, and preferably unnoticeable, when scent areas 14 are not activated or their respective containers 10 are dormantly sitting on shelves. Depending on the balance between dormant and activated scent intensity, special superscented scent areas 14 can be manufactured and marketed toward pet owners of old or sick animals that typically have much higher scent identification thresholds than younger or healthy animals. Typically, the larger the surface of sheet material scratched or rubbed, the higher the intensity of the scent. Also, as mentioned above, the intensity may be initially controlled by the intensity of the scent used in the in-line operation. Similarly, the greater the frequency the sheet material is scratched for a particular olfaction trial, the greater the duration of the scent. Other representative, nontoxic scent or flavor delivery technologies are discussed in U.S. Pat. No. 4,983,404 of Raman et al., U.S. Pat. No. 5,039,243 of O'Brien, and U.S. Pat. No. 5,018,974 of Carnahan et al.

In an alternative embodiment, label 12 also includes a distinctive symbol area 20 that includes one or more distinctive symbols or patterns 22 having backgrounds 24 with distinctive patterns, colors, or intensity contrasts. Symbols 22, backgrounds 24, and their respective patterns, colors, or contrasts are preferably designed to provide visual recognition clues to an animal or infant to aid the animal in associating particular symbols 22 and colors with particular scents or tastes. Symbol areas 20 may be distinct from scent areas 14 as shown in FIG. 1, or symbol areas 20 can overlap or overlay scent areas 14. Symbol areas 20, symbols 22, and backgrounds 24 are described in greater detail with reference to FIG. 4.

In a preferred embodiment, multiple food containers 10 having different ingredients (and/or similar food types with different flavors or scents) are positioned side-by-side with their respective scent areas 14 facing in the same direction. If scent areas 14 have covers 16, the covers are peeled off. Alternatively or additionally, if scent areas 14 are scratch-activated, then they are scratched with a coin, fingernail, or other convenient scratching tool. An animal or pet will approach the containers 10 and sniff or lick the scent areas 14 until the animal indicates by pawing, pushing, attending, or vocalizing at a selected container, or indicating by other recognizable means which container the animal prefers to be opened for its next meal. Then the selected container 10 can be opened and its contents fed to the animal. Skilled persons will appreciate that this method allows nonverbal animals, such as pets or infants, to express a meal preference on a meal-to-meal basis. Pet owners or parents might otherwise have to open several food containers to determine what food the pet or infant is willing to eat at a given meal since these animals cannot verbally communicate a preference.

Skilled persons will also recognize that training an animal to make its own meal selections in this fashion may take numerous trials before the animal learns that a scent area 14 and/or a container 10 selection is indicative of meal selection. Conventional animal training techniques can also be employed to teach the animal a specific meal indicating behavior such as pawing a container 10. Animal training techniques and particularly cat training techniques are described in "Show Biz Tricks for Cats" by Anne Gordon. Pawing a container is a simple variation of standard tricks, such as shaking, waving, or ringing a bell. The rewards to motivate the desired behavior can be any commercially available treats, favorite foods, or scent selection treats of one embodiment of the present invention. For example, such scent selection treats can be of the Whisker Licken's® type, but made to specifically include scenting elements that correspond to the scents and flavors of the ingredients of particular packaged food products such as wet canned cat food. Once the meal indicating behavior for an animal is developed, the animal can then be taught to associate the particular scent areas 14 with the corresponding food ingredients. This association could be facilitated by employing scent selection treats as described above.

In an alternative embodiment, scent areas 14 can form portions of sauce packets having ingredients for flavoring wet or dry cat food with scents or tastes that correspond to the scent-producing agents. The ingredients in the sauce package may be wet or dry or even powdered ingredients that can be mixed with water or added directly to a cat food to enhance the cat food's flavor or scent appeal.

Once the animal learns the association between scent areas 14 and the contents of the following meal, the animal may eventually make a secondary association between symbol area 20 and the contents of container 10. Eventually, the meal selection process will become very quick. Skilled persons will appreciate that a human infant will also quickly grasp the scent recognition technique and will display similar or different understandable meal selection cues and will readily progress onto visual recognition cues. Additionally, cards or game pieces containing scent areas 14 can be presented to an animal or an infant to allow the animal or infant to choose a food by selecting a food-scented card or game piece. The cards or game pieces can resemble labels 12 and can be scented in accordance with the techniques presented above or as disclosed in U.S. Pat. No. 4,487,585 of Goldwasser.

Alternatively, with reference to FIGS. 2A, 2B, 2C, and 2D (collectively FIG. 2) and FIGS. 3A, 3B, 3C, and 3D (collectively FIG. 3), three-dimensional toys 25 or 27, scented to resemble the scents of the food contents of containers 10, can be presented to pets or infants. For example, cats can be presented with toy mice 25*a*, chicks 25*b*, rabbits 25*c*, snakes 25*a*, etc. (collectively toys 25) as shown in FIG. 2 that are respectively scented with smells corresponding to beef, chicken, pork, or fish flavored food products in containers 10. On the other hand, infants can, for example, be presented with toy bananas 27*a*, carrots 27*b*, turkey 27*c*, apples 27*d*, etc. (collectively toys 27) as shown in FIG. 3 that are respectively scented with smells corresponding to food products containing the corresponding food substances in containers 10. Toys 25 and 27 may optionally be suited for teething as well. Although it is preferable that symbols 22 or toys 25 or 27 have some visual association with the food type in container 10 (especially as an educational tool for infants), skilled persons will appreciate that the game pieces or toys 25 or 27 do not need to have any true visual correlation. Each food type can be represented by a different toy 25 or 27, and each food flavor variation can be represented by a distinctive odor and, optionally, a distinctive color. The distinctive color can alternatively be associated with a distinctive food texture or style such as chunky or pate-like. In addition, toys 25 or 27 are preferably shaped or sized to make swallowing difficult. Toys 25 or 27 can be made from materials that are chemically inert in the animal's digestive system and preferably exhibit moderate hardness, resilient deformability, large tensile strength, and resistance to shearing. Toys 25 or 27 can alternatively or additionally be covered with a natural or synthetic fur that is treated with the scenting agent.

Toys 25 or 27 can be scented with odors corresponding to the contents of containers 10 with treatments as described above or with scent areas 14 placed inside toys 25 or 27 as in the manner described in U.S. Pat. No. 5,640,931 of Markham. Toys of the type described in U.S. Pat. No. 5,813,366 of Mauldin, Jr. may similarly be employed with scent areas or scent selection treats as described above.

Alternatively, toys 25 or 27 may comprise a nylon substrate impregnated with a scenting element by immersing toys 25 or 27 in an aqueous solution containing the scenting element and subjecting toys 25 or 27 to prolonged contact with the solution. The solution is absorbed by the nylon substrate. The odor (and optional flavor) components can be released by twisting or roughing up the toy or when the animal chews on the toy. Examples of such odor-impregnating techniques are disclosed in U.S. Pat. Nos. 3,871,334 and 4,674,444, both of Axelrod. In another embodiment, the scent-producing elements and optional flavor components can be added to and uniformly distributed throughout a polyurethane toy during the initial formulation of the polyurethane. This process is disclosed in U.S. Pat. No. 4,513,014 of Edwards.

FIG. 4 shows an embodiment of a sampler strip 40 having multiple scent areas 14, 14*a*, 14*b*, 14*c*, and 14*d* (collectively 14). Scent areas 14*a*, 14*b*, 14*c*, and 14*d* are, for example, scented or flavored with fish, poultry, beef, and pork, respectively. Each scent area 14 is preferably accompanied with a respective symbol area 20*a*, 20*b*, 20*c*, or 20*d* (collectively 20). Scent areas 14 can be covered with respective individual peel-off covers 16*a*, 16*b*, 16*c*, 16*d* (collectively 16), a single cover film (not shown) that covers the entire length of strip 40, or uncovered. Symbol areas 20 contain respective symbols 22*a*, 22*b*, 22*c*, and 22*d*, such as a fish, chicken, cow, or pig, that are respectively indicative of the scents or flavors of scent areas 14*a*, 14*b*, 14*c*, and 14*d*. Alternatively, symbols 22 are more simplistic geometric figures, such as circles, rectangles, triangles, and stars, that may be more discretely recognizable by particular animals. The symbols 22 and respective backgrounds 24*a*, 24*b*, 24*c*, and 24*d* in the symbol areas 20 preferably have distinctive colors. Skilled persons will appreciate that symbols 22 may be repeated with different internal solid or background colors to indicate perhaps a food style such as stewed, chunky, minced, pate, sliced, or juicy. For example, rectangles are used to represent fish, triangles to represent chicken, circles to represent beef, and stars to represent pork. Blue rectangles are used to represent salmon, green rectangles to represent tuna, and white rectangles to represent whitefish. Furthermore, a dotted background 24*a* indicates minced food, a slanted-lined background 24*b* indicates sliced food, a horizontal background 24*c* indicates chunky, a solid color background 24*d* indicates pate, and vertical lines indicate stewed.

In addition to the examples provided above, skilled persons will appreciate the nearly limitless number of symbol, color, pattern, contrast, and background combinations that are available to specifically identify a food type, flavor, and style symbolically. These combinations can be adapted to the visual acuities of particular animal species. Cats, for example, recognize luminance-based patterns more readily than they recognize colors. Alternatively, these combinations can be adapted for the particular age of the end user or purchaser or be adapted for their language or culture.

Skilled persons will appreciate that even if a particular animal never learns to associate the symbols 22 with the contents of food container 10, to bypass the scent selection process, the symbols 22 may make it easier for pet owners to locate desired food containers 10 on a crowded supermarket shelf. Skilled persons will also appreciate that the icons and colors can be accompanied by words (to aid the human purchasers), but the symbols 22 can be more readily recognizable even at a distance.

Since strips 40 may contain tens of scent areas 14, strips 40 may be designed with fold lines 50 so that strips can be folded for ease of transport. For example, fold lines 50 can be placed after every third or fifth scent area 14. Sample strips are also preferably less expensive than the food products and containers 10 and are preferably reusable.

Figure 5:
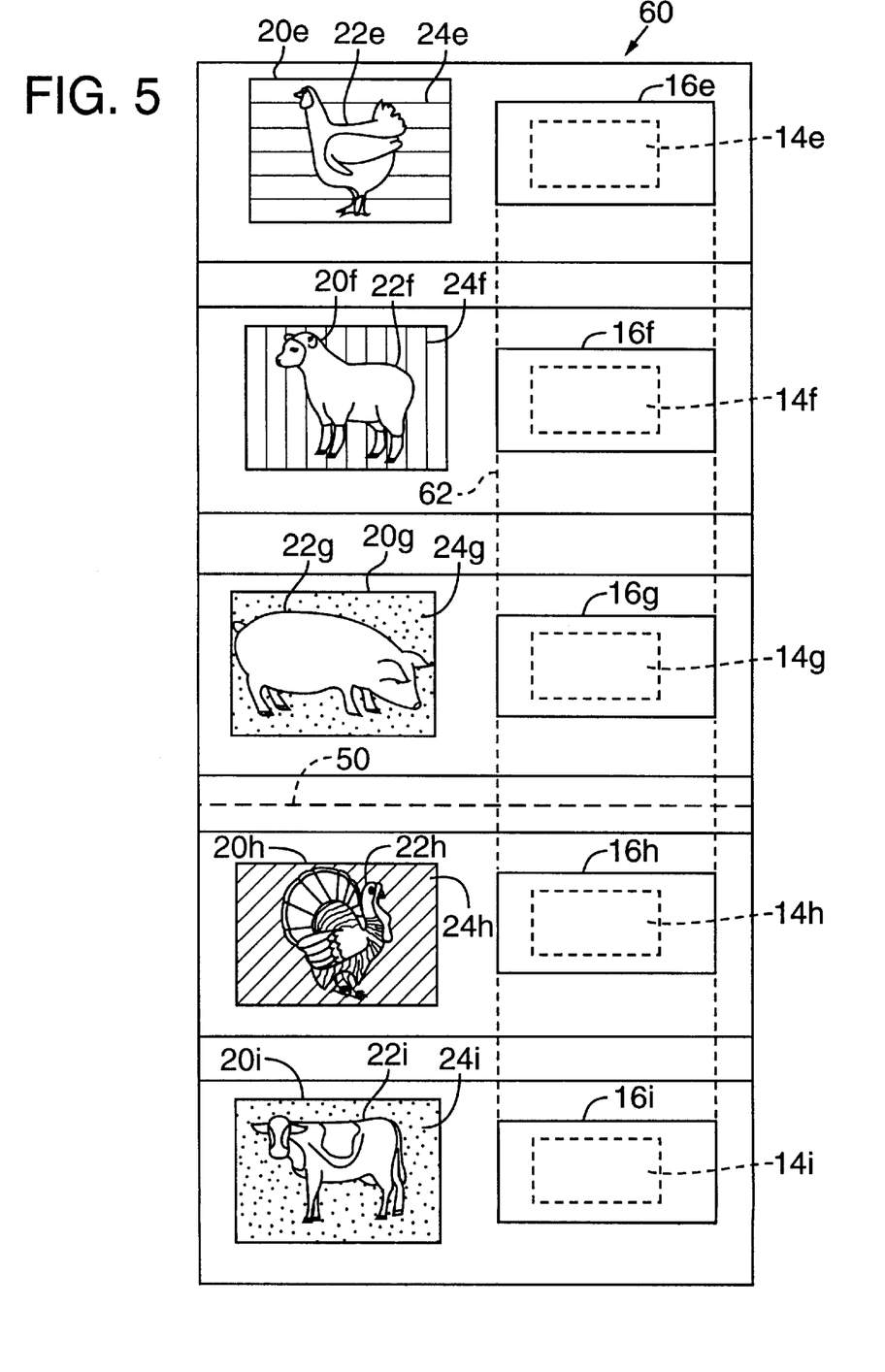
FIG. 5 is a plan view of an embodiment of a columnar sampler strip containing scent areas for a variety of pet food flavors.

FIG. 5 shows an alternative embodiment of a sampler strip 60 arranged as a column of scent areas 14 (14e–14i) and symbol areas 20 (20e–20i). An advantage of sampler strip 60 is that individual peel-off covers 16e, 16f, 16g, 16h, and 16i are easily replaced by a single elongated film cover 62 that sequentially exposes each scent area 14 as it is peeled off.

Figures 6, 7:
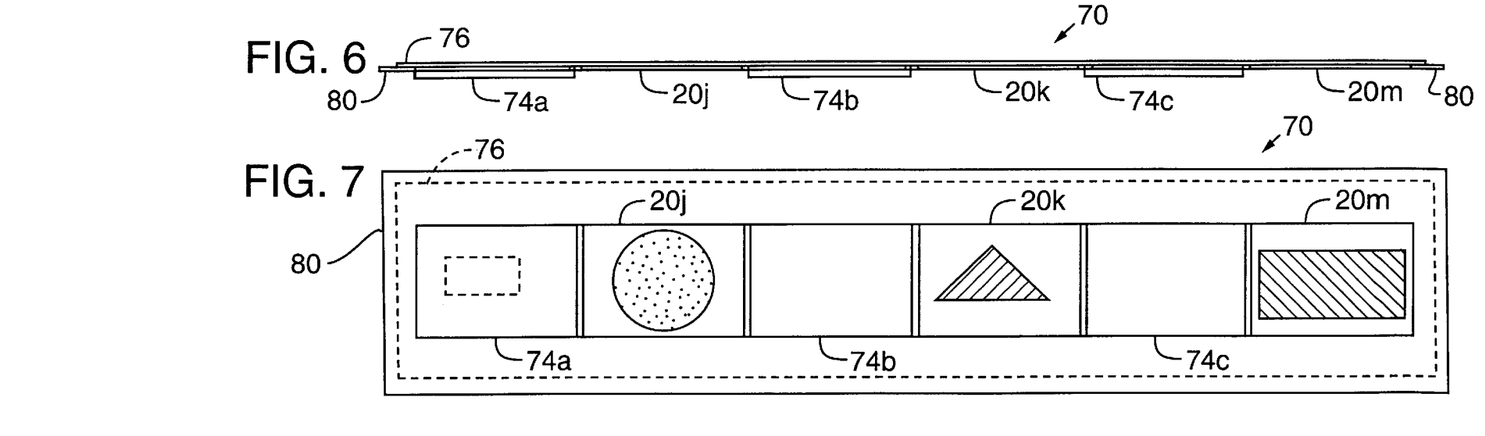
FIG. 6 is a side elevation view of a sampler strip of sample cells containing food samples.
FIG. 7 is a plan view of the sampler strip shown in FIG. 6.

FIG. 6 shows a side elevation view of a sampler strip 70 that contains small self-contained sample cells 74 of food types and/or styles, and FIG. 7 shows a plan view of sampler strip 70 shown in FIG. 6. With reference to FIG. 6, sampler strip 70 is preferably a plastic container 80 having a plurality of sample cells 74. Sample cells 74 are preferably small, shallow, jam-package-like containers of food samples preferably attached in a row or column. Sample cells 74 include an interior space defined by an aperture and one or more contiguous exterior walls that can be planar or curved. Each interior space is adapted to contain about ½ teaspoon to 3 tablespoons of a different food product. Skilled persons will appreciate that the size of the sample cells 74 can be adjusted to be larger or smaller based on the size of the prospective animal testers. A film cover 76 is removably secured across the aperture to maintain the sample food products in their individual sample cells. Film cover 76 preferably comprises an elongated piece of a film type material that sequentially exposes the contents of each sample cell 74. In addition, sampler strip 70 and cover 76 can be crimped between each sample cell 74 so that an animal can be exposed to the contents of one sample cell 74 at a time, if desirable. Sample cells 74 may also be associated with symbols 22 and colors and/or word descriptions 20j, 20k, and 20m that are similar to or different from those previously discussed. An example of such packaging containers is disclosed in U.S. Pat. No. 5,375,701 of Hustad et al. and in U.S. Pat. No. 5,695,798 of Rozzano.

An advantage of sampler strips 40, 60, or 70 is that they can be taken home and presented to animals before purchases of food containers 10 are made. A pet owner can gauge by a pet's reaction to the various scent areas 14 or sample cells 74 which flavors to purchase on a future shopping expedition. Alternatively, sets of food-scented cards, game pieces, or toys can be given away or sold separately so that prospective food product purchasers can make purchasing decisions by an infant's or animal's preference for the scented items prior to shopping.

Although aspects of the present invention are described above largely in connection with pets, such as felines or canines, skilled persons will appreciate that the meal selection techniques in accordance with the present invention can be affected by other domesticated or trainable animals, particularly carnivorous or omnivorous mammals, such as ferrets, pigs, or monkeys. These or other suitable pets all have sophisticated olfactory and memory systems and capabilities amenable to meal selection in accordance with the present invention. Certain pet birds and reptiles also have sufficient olfactory and memory capabilities to respond to the meal selection techniques described herein.

Skilled persons will also appreciate that the invention system will work just as well or even better for human babies, who cannot verbalize their food preferences. Furthermore, the scent-oriented labeling technique can be advantageous even for adult humans who may be trying to decide between different types or flavors of wine, soup, chili, or tomato sauce. Scent areas 14 would provide olfactory information to the potential purchasers of such products, and the olfactory information could be at least as important as the other information provided on the labels. The scent oriented labeling technique would also be particularly advantageous for blind people who cannot read the labels.

Skilled persons will also appreciate that the food scenting elements on scent areas 14 should resemble as closely as possible the scents of the food products within the respective containers 10 to avoid misleading pets, infants, or product purchasers as to the contents of containers 10.

In one embodiment, a set of cat food products in containers 10 (aluminum cans) includes subsets of products having different textures, such as ground, sliced, and shredded products. Each subset of products includes a variety of products from different flavor groups, such as such as mammal, poultry, or seafood, or combinations thereof. In addition, each flavor group of products may include a variety of products having specific flavor and scent types. For example, products from the mammal group may have types including beef, lamb, of pork; products from the poultry group may have types including chicken or turkey; and products from the seafood group may have types including shrimp or fish, such as salmon, tuna, whitefish, or combinations thereof. The contents of exemplary particular product types are provided below in Example I. The contents are listed in order by amount.

EXAMPLE I

Canned Cat Food

A. Ground Products

1. Ground Beef Product

Ingredients: Water sufficient to process, beef, wheat middlings, dried whey, salt, steamed bone meal, guar gum, caramel color, sodium tripolyphosphate, potassium chloride, carrageenan, taurine, iron oxide, vitamin supplements (E, A, B12, D3), zinc sulfate, thiamin mononitrate, niacin, manganese sulfate, riboflavin supplement, calcium pantothenate, pyridoxine hydrochloride, biotin, folic acid, potassium iodide.

2. Ground Chicken Product

Ingredients: Water sufficient for processing, chicken, wheat middlings, dried whey, salt, steamed bone meal, guar gum, titanium dioxide, sodium tripolyphosphate, potassium chloride, choline chloride, carrageenan, taurine, vitamin supplements (E, A, B12, D3), zinc sulfate, thiamin mononitrate, sodium nitrite, niacin, manganese sulfate, riboflavin supplement, calcium pantothenate, pyridoxine hydrochloride, biotin, folic acid, potassium iodide.

3. Ground Seafood Product

Ingredients: Water sufficient to process, fish, wheat middlings, steamed bone meal, dried whey, salt, guar gum, sodium tripolyphosphate, potassium chloride, shrimp, crab, titanium dioxide, carrageenan, choline chloride, taurine, vitamin supplements (E, A, B12, D3), zinc sulfate, sodium nitrite, thiamin mononitrate, niacin, manganese sulfate, riboflavin supplement, calcium pantothenate, pyridoxine hydrochloride, biotin, folic acid, potassium iodide.

4. Ground Salmon Product

Ingredients: Water sufficient for processing, salmon, wheat middlings, fish, steamed bone meal, dried whey, salt, guar gum, sodium tripolyphosphate, titanium dioxide, potassium chloride, carrageenan, choline chloride, sodium nitrite, vitamin supplements (E, A, B12, D3), zinc sulfate, thiamin mononitrate, niacin, manganese sulfate, riboflavin supplement, calcium pantothenate, pyridoxine hydrochloride, biotin, folic acid, potassium iodide.

B. Sliced Products

1. Sliced Beef Product

Ingredients: Water sufficient for processing, beef, wheat gluten, wheat flour, soy protein concentrate, high fructose corn syrup, modified starch, salt, steamed bone meal, guar gum, choline chloride, taurine, vitamin supplements (E, A, B12, D3), zinc sulfate, thiamin mononitrate, niacin, manganese sulfate, riboflavin supplement, calcium pantothenate, pyridoxine hydrochloride, biotin, folic acid, potassium iodide.

2. Sliced Chicken Product

Ingredients: Water sufficient for processing, chicken, soy protein concentrate, wheat gluten, wheat flour, modified starch, soy flour, guar gum, salt, choline chloride, titanium dioxide, taurine, vitamin supplements (E, A, B12, D3), zinc sulfate, thiamin mononitrate, niacin, manganese sulfate, riboflavin supplement, calcium pantothenate, pyridoxine hydrochloride, biotin, folic acid, potassium iodide.

C. Shredded Products

1. Shredded Turkey Product

Ingredients: Water sufficient for processing, turkey, wheat gluten, wheat flour, soy protein concentrate, modified food starch, guar gum, steamed bone meal, salt, choline chloride, potassium chloride, titanium dioxide, taurine, vitamin supplements (E, A, B12, D3), zinc sulfate, thiamine mononitrate, niacin, manganese sulfate, riboflavin supplement, calcium pantothenate, pyridoxine hydrochloride, biotin, folic acid, potassium iodide.

2. Shredded Chicken Product

Ingredients: Water sufficient for processing, chicken, wheat gluten, wheat flour, soy protein concentrate, modified food starch, steamed bone meal, guar gum, salt, titanium dioxide, choline chloride, potassium chloride, taurine, vitamin supplements (E, A, B12, D3), zinc sulfate, thiamine mononitrate, niacin, manganese sulfate, riboflavin supplement, calcium pantothenate, pyridoxine hydrochloride, biotin, folic acid, potassium iodide.

3. Shredded Salmon Product

Ingredients: Water sufficient for processing, salmon, wheat gluten, wheat flour, soy protein concentrate, modified food starch, titanium dioxide, guar gum, salt, steamed bone meal, choline chloride, potassium chloride, taurine, vitamin supplements (E, A, B12, D3), zinc sulfate, thiamine mononitrate, niacin, manganese sulfate, riboflavin supplement, calcium pantothenate, pyridoxine hydrochloride, biotin, folic acid, potassium iodide, iron oxide, sodium nitrite.

Skilled persons will recognize that the food products contain largely overlapping ingredients regardless of food texture, group, or flavor. In some circumstances, only a few ingredients or the relative amounts of the ingredients differ between products. Because feline and canine olfactory systems are extremely sensitive, such animals may be able to detect the odor differences between such food products, e.g. between the chicken products (A2, B2, and C2) presented above. Thus, in one embodiment, the scent producing elements on labels 12 are adapted to resemble the scents of the respective food products in containers 10 as much as possible. This scent equivalence embodiment will minimize trial and error in familiarizing an animal with the meal selection process. This scent equivalence process will also be advantageous for product selection based on prepurchase sampler strips 40 and 60.

Scenting and flavoring agents are widely available. A simple search of the Food Ingredients Online—Buyer's Guide revealed over 70 companies that provide flavors and fragrances for pet food. Although some of the compositions of these scenting agents are proprietary, through simple experimentation a skilled person could select one or more process-compatible scenting elements to represent each particular food product.

Alternatively, to address incompatibilities with particular scent delivery systems such as the scratch and sniff or SCENTIFIC™ processes, labels 12 can utilize scent producing elements that may not be identical to the aromas of the products. Such scent producing elements include, edible nontoxic oils, oil extracts of one or more of the main ingredients or a natural or synthetic compounds, solutions, or mixtures that smell or taste like the main ingredients to enhance the scent differences between the labels 12. Furthermore, scent producing agents that are already proven to be compatible with these scent delivery systems can be combined to resemble the scents of the respective food products to the extent possible. A skilled person will also appreciate that the scent producing agent need not even resemble the scents that emanate from the respective food products, so long as each species of label 12 has a distinctive scent. Thus, a one-to-one scent area-to-food product relationship can be established with the scent producing agents that have already been proven with these scent release systems since some system-compatible meat product scents may be difficult to reproduce accurately. For example with reference to Example I, labels 12 for the ground beef product (A1) can be treated with a leather scent; labels 12 for the ground chicken product (A2) can be represented with a chicken scent; labels 12 for the ground seafood product (A3) can be represented with a ocean breeze scent; and labels 12 for the ground salmon product (A4) can be represented with a rose scent.

Although this embodiment might decrease an animals initial preference correlation between sampler strips 40 and 60 and the respective food products, the emphasis on the discreteness of the scents between respective labels 12 would be likely to increase an animal's meal selection learning curve, especially in view of the higher scent identification thresholds of old or ailing animals and the scent similarities between the food products in Example I. The animals will quickly learn to identify a particular scent on a label 12 with a particular food product despite differences between the odor of the scenting agents and the aroma of the food product. Skilled persons will appreciate, however, that these scent producing elements could also be added to the respective food products to increase the aroma similarity between the products and the labels, if desirable.

Sandy Alexander, Inc. has already proven the use of chicken, roast, and leather scents in their SCENTIFIC™ process, which has also proven a wide variety of floral, fruity, herbal, and woodsy, scents as well. Some scents currently available for use in the SCENTIFIC™ process include anise, apple, arnica, balm mint, banana, basil, black pine, caraway, carnation, chamomile, chicken, cheese, cherry, Chinese ceder wood, chocolate, Christmas, cinnamon, coconut, coffee, cypress, dill weed, eucalyptus, fir, fleurier, florogenia, forest ground, fresh baked bread, ginger bread, green apple, green bean, green spruce, hay flower, hazel, honey, hyacinth, incense, jacilia, jasmine, juniper, keymi, lavender, leather, lemon, lilac, lotus, mandarin, mango, maracuja, marjoram, May-flower, menthol, mixed alpine herbs, mixed kitchen, mugol, northern birch, ocean breeze, orange, orchid, ozone pine, peach, pear, petunias, pine, pinewood, pink pepper, pizza, plum, roast, rose, raspberry, rosemary, sandalwood, sea breeze, Siberian spruce, spring, spruce pine, strawberry, thyme, tobacco, tomato, valerian, vanilla, violet, waffle, white bread, and wild woodberry.

The 3M scratch and sniff process has also employed chicken, beef, hamburger, bacon, chili, hot dog, and anchovy scents, as well as floral, fruity, herbal, woodsy, and other scents. Some scents currently available for use in the 3M process include alfalfa, almond, anchovy, apple, apple pie, baby powder, bacon, bakery, banana, band-aid, bayberry, beef, blueberry, bubble gum, butter, butter pecan, butterscotch, cantaloupe, caramel, carnation, carrot, ceder, cheese, cherry, cherry pie, chicken, chili, chocolate, cinnamon, clove, coconut, cola, corn, cotton candy, cucumber, custard, daffodil, diesel fuel, dill pickle, eucalyptus, frankincense, french fries, fresh bread, gardenia, garlic, gasoline, general floral, geranium, ginger, ginger bread, grape, grapefruit, hamburger, hay, honey, honeydew, honeysuckle, hot dog, hyacinth, jelly bean, kerosine, lawn, leather, lemon, licorice, lilac, lily, lime, mango, maple, marshmallow, melon, menthol, mildew, mint, mothballs, musk, new car, onion, orange, orange blossom, orchid, oregano, peach, peanut, peanut butter, pear, peppermint, perfume, pine, pineapple, pizza, plum, popcorn, potato chip, pretzel, pudding, pumpkin pie, raspberry, root beer, rose, rubber tire, soap, spaghetti, spearmint, strawberry, tea, tomato, tulip, vanilla, violet, watermelon, and wintergreen.

In yet another embodiment, the scent areas of labels 12 are treated with one or more secondary scent producing elements that are discrete from the odors emanating from or associated with the respective food products. The secondary scent producing agent may be associated with a different aspect of the respective food products, such as texture.

For example, with reference to Example I, labels 12 indicative of ground food products are additionally treated with a floral scent such as lavender; labels 12 indicative of sliced food products are additionally treated with a herbal scent such as vanilla; and labels 12 indicative of shredded food products are additionally treated with a fruity scent such as apple. These scents have all been proven in both the SCENTIFIC™ and scratch and sniff processes. A skilled person will recognize that this scent scheme is a single example and that a wide variety of scent schemes are possible. Although the addition of a secondary scenting agent may slow the initial learning phase of an animal in the meal selection process, the animals will quickly learn to identify a particular secondary scent on a label 12 with a particular food texture as well as associate the primary scent with the food flavor. This embodiment may be particularly advantageous for old or ailing animals when there are only slight ingredient differences between food products having different textures.

Skilled persons will appreciate that the secondary scent producing element may be integrated with the primary flavor-related scent producing agent, applied next to it, or be applied to a separate secondary scent area different from scent area. Skilled persons will also appreciate that secondary scenting agents can be incorporated into toys and sampler strips 40, 60, and 70, as wells as labels 12.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method employing olfactory information to facilitate selection of a fragrance-isolated pet food product, comprising:
   providing distinct first and second pet foods in respective first and second fragrance-isolating food containers, each food container having an exterior surface;
   attaching a first substrate to the exterior surface of the first fragrance-isolating food container;
   attaching a second substrate to the exterior surface of the second fragrance-isolating food container;
   applying to, or integrating into, the first substrate a first scent-producing agent that identifies the first pet food; and
   applying to, or integrating into, the second substrate a second scent-producing agent that identifies the second pet food, the second scent-producing agent being distinctive from the first scent-producing agent to enable a pet sampling the first and second scent-producing agents to exhibit a behavior to express a preference for the first or second pet food prior to either the first or second food container being opened.

2. The method of claim 1 further comprising:
   simultaneously presenting the first and second scent-producing agents to the pet prior to opening either the first or the second food container at a given meal time; and
   determining by the behavior of the pet whether it prefers the first scent-producing agent or the second scent-producing agent.

3. The method of claim 2 further comprising:
   presenting the pet with the first pet food or the second pet food based on the behavior of the pet.

4. The method of claim 1 in which the first and second scent-producing agents are friction-activated.

5. The method of claim 4 in which the first and second scent-producing agents can be activated more than once.

6. The method of claim 1 in which the pet comprises a canine.

7. The method of claim 1 in which the pet comprises a cat.

8. The method of claim 1 in which the first and second pet foods comprise cat food.

9. The method of claim 8 in which the first and second substrates each comprise a label and the first and second scent-producing agents are friction-activated.

10. The method of claim 1 in which the first and second substrates each comprise at least one label.

11. The method of claim 1 in which the first substrate has been in contact with a sample of the first pet food and the second substrate has been in contact with a sample of the second pet food.

12. The method of claim 1 in which the first scent-producing agent has a first flavor that corresponds to the first pet food and the second scent-producing agent has a second flavor that corresponds to the second pet food.

13. The method of claim 1 in which the first solid food ingredient comprises a first meat and the second solid food ingredient comprises a second meat different from the first meat, and in which the first scent-producing agent is indicative of the first meat and the second scent-producing agent is indicative of the second meat.

14. The method of claim 13 in which the first and second meats comprise tuna, trout, salmon, whitefish, chicken, turkey, beef, or lamb.

15. The method of claim 1 in which the first and second pet foods comprise sauce ingredients for flavoring a third pet food product to enhance its scent to better correspond to the scent of the first or second scent-producing agents.

16. The method of claim 1 in which the fragrance-isolating food containers comprise cans, jars, or bottles.

17. The method of claim 1 in which the food containers comprise plastic.

18. The method of claim 1 further comprising:
a first visual cue printed on or integrated into the first substrate; and
a second visual cue printed on or integrated into the second substrate, the first and second visual cues being adapted to be distinguishable from each other by the pet.

19. The method of claim 18 in which the first and second visual cues are indicative of different food textures.

20. The method of claim 1, in which the first and second food products have respective first and second textures, further comprising:
respective third and fourth scent-producing agents indicative of the respective first and second textures applied to or integrated into the respective first and second substrates or introduced into the respective first or second food products.

21. The method of claim 20 in which the first and second food products comprise similar ingredients.

22. The method of claim 20 in which the first substrate has a first color indicative of the first texture and the second substrate has a second color indicative of the second texture, the first color being different from the second color and distinguishable by the pet.

23. The method of claim 1 in which the first and second scent-producing agents are not in contact with the respective first and second pet foods and respectively produce an odor that is not identical to a food odor produced by the respective first and second pet foods.

24. The method of claim 1 in which sampling comprises sniffing.

25. Pet toys scented with odors corresponding to contents of packaged pet food products, comprising:
a first fragrance-isolating food container;
a first pet food having a first solid food ingredient sealed within the first container;
a second fragrance-inhibiting isolating food container;
a second pet food having a second solid food ingredient sealed within the second container;
a first pet toy having a first scent-producing agent indicative of the first pet food; and
a second pet toy having a second scent-producing agent indicative of the second pet food, the first pet food being different from the second pet food and the first scent-producing agent being different from the second scent-producing agent.

26. The pet toys and pet food products of claim 25 in which the first and second scent-producing agents are friction-activated.

27. The pet toys and pet food products of claim 25 in which the first scent-producing agent has a first flavor that corresponds to the first pet food and the second scent-producing agent has a second flavor that corresponds to the second pet food.

28. The pet toys and pet food products of claim 25 in which the first and second scent-producing agents are distinguishable by a pet and the pet comprises a canine.

29. The pet toys and pet food products of claim 28 in which the pet comprises a cat.

30. The pet toys and pet food products of claim 25 in which the pet food product comprises sauce.

31. The pet toys and pet food products of claim 25 in which the first solid food ingredient comprises a first meat and the second solid food ingredient comprises a second meat different from the first meat, and in which the first scent-producing agent is indicative of the first meat and the second scent-producing agent is indicative of the second meat.

32. The pet toys and pet food products of claim 31 in which the first and second meats comprise tuna, trout, salmon, whitefish, chicken, turkey, beef, and/or lamb.

33. The pet toys and pet food products of claim 25 in which the first and second food containers each comprise a can.

34. The pet toys and pet food products of claim 25 in which the first and second food containers comprise plastic.

35. The pet toys and pet food products of claim 25 in which the first substrate or first pet toy has been in contact with a sample of the first pet food and the second substrate or second pet toy has been in contact with a sample of the second pet food.

36. The pet toys and pet food products of claim 25 in which the first pet toy has a different shape from that of the second pet toy.

37. The pet toys and pet food products of claim 25 in which the first pet toy has a different color from that of the second pet toy.

38. The pet toys and pet food products of claim 25 in which the first and second scent-producing agents enable a pet sampling the first and second scent-producing agents to exhibit a behavior to express a preference for the first and second pet foods without either the first or second pet food containers being opened prior to selection.

39. The pet toys and pet food products of claim 25, in which the first and second food products have respective first and second textures, further comprising:
respective third and fourth scent-producing agents indicative of the respective first and second textures applied to or integrated into the respective first and second pet toys or introduced into the respective first or second food products.

40. The pet toys and pet food products of claim 25 in which the first pet toy has a first color indicative of the first texture and the second pet toy has a second color indicative of the second texture, the first color being different from the second color.

41. The pet toys and pet food products of claim 25 in which the pet toys comprise materials that are chemically inert in a mammal's digestive system.

42. The pet toys and pet food products of claim 25, comprising:
a first exterior surface on the first fragrance-isolating food container;
a first substrate attached to the first exterior surface of the first food container;
a second exterior surface on the second fragrance-isolating food container;

a second substrate attached to the second exterior surface of the second food container;

a first scent-producing agent applied to or integrated into the first substrate, the first scent producing agent being indicative of the first scent; and a second scent-producing agent applied to or integrated into the second substrate, the second scent-producing agent being different from the first scent-producing agent and being indicative of the second scent.

43. The pet toys and pet food products of claim 42 in which the first and second substrates each comprise at least one label.

44. The pet toys and pet food products of claim 42 further comprising:

a first visual cue printed on or integrated into the first substrate; and a second visual cue printed on or integrated into the second substrate, the first and second visual cues being adapted to be distinguishable from each other by a pet.

45. The pet toys and pet food products of claim 42 in which the first and second scent-producing agents can be activated more than once.

46. The pet toys and pet food products of claim 42 in which the first and second pet foods comprise cat food.

47. The pet toys and pet food products of claim 25 in which the fragrance-isolating food containers comprise cans, jars, or bottles.

* * * * *